United States Patent
Aoki et al.

(10) Patent No.: US 7,310,429 B2
(45) Date of Patent: Dec. 18, 2007

(54) UNAUTHORIZED-ALTERATION DETECTING METHOD, UNAUTHORIZED-ALTERATION DETECTING PROGRAM, AND RECORDING MEDIUM HAVING RECORDED THE PROGRAM

(75) Inventors: Naofumi Aoki, Hokkaido (JP); Hideaki Tamori, Hokkaido (JP); Tsuyoshi Yamamoto, Hokkaido (JP)

(73) Assignee: Japan Science and Technology Agency, Saitama (JP)

( * ) Notice: Subject to any disclaimer, the term of this patent is extended or adjusted under 35 U.S.C. 154(b) by 241 days.

(21) Appl. No.: 10/531,584

(22) PCT Filed: Oct. 28, 2003

(86) PCT No.: PCT/JP03/13772

§ 371 (c)(1),
(2), (4) Date: Nov. 22, 2005

(87) PCT Pub. No.: WO2004/040902

PCT Pub. Date: May 13, 2004

(65) Prior Publication Data

US 2006/0159273 A1   Jul. 20, 2006

(30) Foreign Application Priority Data

Oct. 30, 2002   (JP)   ............................. 2002-315391

(51) Int. Cl.
*G06K 9/00* (2006.01)
(52) U.S. Cl. ...................... 382/100; 382/232; 382/240; 713/176; 713/179; 380/51; 386/94; 358/3.28
(58) Field of Classification Search ................ 382/100, 382/232, 240; 713/176, 179; 380/51; 386/94; 358/3.28

See application file for complete search history.

(56) References Cited

U.S. PATENT DOCUMENTS 5,930,369 A  *  7/1999  Cox et al. ...................... 380/54

(Continued)

FOREIGN PATENT DOCUMENTS

EP           1 221 816 A2      12/2001

(Continued)

OTHER PUBLICATIONS

Paten Abstact of Japan 2002-201703 Jul. 19, 2002.
"A Digital Watermarking Technique for Detecting Alteration on Still Images Using Number Theoretic Transform" Hideaki Tamori, Naofumi Aoki, and Tsuyoshi Yamamoto. Graduate School of Engineering, Hokkaido University.

(Continued)

*Primary Examiner*—Samir Ahmed
*Assistant Examiner*—Nancy Bitar
(74) *Attorney, Agent, or Firm*—Lowe Hauptman Ham & Berner, LLP

(57) ABSTRACT

A false alteration detecting method using an electronic watermark method of fragile type by number theoretic transform. A processing section sets parameters P, N, α of number theoretic transform (S101), and reads original image blocks $f_{i,j}(x,y)$ (S103), conducts number theoretic transform of $f_{i,j}(x,y)$ to calculate the number theoretic transform blocks $F_{i,j}(x,y)$ (S105), determines the position (x',y') at which a signature image is to be embedded by using a randomizing function (S107), reads pixel values $g_{i,j}$ of the signature image for embedment from a storage section (S109), determines the embedment value δ of each block from the $F_{i,j}(x',y')$ of the embedment position and $g_{i,j}$ (S111), adds the embedment value δ to the $F_{i,j}(x,y)$ or subtracts the embedment value δ from the $F_{i,j}(x,y)$ to determine the number theoretic transform blocks $H_{i,j}(x,y)$ of the embedded image block (S113), calculates the inverse number theoretic transform of the $H_{i,j}(x,y)$, determines the embedded image blocks $h_{i,j}(x,y)$, stores them, and outputs them to an output section.

11 Claims, 13 Drawing Sheets

TABLE OF y^x (mod 13) OF PRIME 13

| y^x | 1 | 2 | 3 | 4 | 5 | 6 | 7 | 8 | 9 | 10 | 11 | 12 | ORDER |
|---|---|---|---|---|---|---|---|---|---|---|---|---|---|
| 1 | 1 | 1 | 1 | 1 | 1 | 1 | 1 | 1 | 1 | 1 | 1 | 1 | 1 |
| 2 | 2 | 4 | 8 | 3 | 6 | 12 | 11 | 9 | 5 | 10 | 7 | 1 | 12 |
| 3 | 3 | 9 | 1 | 3 | 9 | 1 | 3 | 9 | 1 | 3 | 9 | 1 | 3 |
| 4 | 4 | 3 | 12 | 9 | 10 | 1 | 4 | 3 | 12 | 9 | 10 | 1 | 6 |
| 5 | 5 | 12 | 8 | 1 | 5 | 12 | 8 | 1 | 5 | 12 | 8 | 1 | 4 |
| 6 | 6 | 10 | 8 | 9 | 2 | 12 | 7 | 3 | 5 | 4 | 11 | 1 | 12 |
| 7 | 7 | 10 | 5 | 9 | 11 | 12 | 6 | 3 | 8 | 4 | 2 | 1 | 12 |
| 8 | 8 | 12 | 5 | 1 | 8 | 12 | 5 | 1 | 8 | 12 | 5 | 1 | 4 |
| 9 | 9 | 3 | 1 | 9 | 3 | 1 | 9 | 3 | 1 | 9 | 3 | 1 | 3 |
| 10 | 10 | 9 | 12 | 3 | 4 | 1 | 10 | 9 | 12 | 3 | 4 | 1 | 6 |
| 11 | 11 | 4 | 5 | 3 | 7 | 12 | 2 | 9 | 8 | 10 | 6 | 1 | 12 |
| 12 | 12 | 1 | 12 | 1 | 12 | 1 | 12 | 1 | 12 | 1 | 12 | 1 | 2 |

U.S. PATENT DOCUMENTS

| | | | | |
|---|---|---|---|---|
| 6,185,312 | B1 * | 2/2001 | Nakamura et al. | 382/100 |
| 7,072,522 | B2 * | 7/2006 | Miyake et al. | 382/252 |
| 7,142,689 | B2 * | 11/2006 | Hayashi et al. | 382/100 |
| 2002/0191856 | A1 * | 12/2002 | Umeda et al. | 382/252 |

FOREIGN PATENT DOCUMENTS

| | | |
|---|---|---|
| JP | 11-355558 | 12/1999 |
| JP | 2000-228632 | 8/2000 |
| JP | 2001-024876 | 1/2001 |
| JP | 2001-148778 | 5/2001 |
| JP | 2002-044429 | 2/2002 |
| JP | 2004-048285 | 2/2004 |

OTHER PUBLICATIONS

"Localization and Correction of Digital Image Alteration Using Fragile Watermarks Based on Number Theoretic Transform" Hideaki Tamori, Naofumi Aoki, and Tsuyoshi Yamamoto.

"A Secure Watermarking for Changing Points Detection" Keiichi Iwamura, Junichi Hayashi, Kouichi Sakurai, Hideki Imai Oct. 13, 2001.

IEICE Transactions on Fundamentals of Electronics, Communications and Computer Sciences, Aug. 2002 A publication of the engineering sciences society.

Proceeding of the 2002 IEICE General Conference, Mar. 27-30, 2002, Waseda University, Tokyo.

* cited by examiner

TABLE OF $y^x$ (mod 13) OF PRIME 13

| $y^x$ | 1 | 2 | 3 | 4 | 5 | 6 | 7 | 8 | 9 | 10 | 11 | 12 | ORDER |
|---|---|---|---|---|---|---|---|---|---|---|---|---|---|
| 1 | 1 | 1 | 1 | 1 | 1 | 1 | 1 | 1 | 1 | 1 | 1 | 1 | 1 |
| 2 | 2 | 4 | 8 | 3 | 6 | 12 | 11 | 9 | 5 | 10 | 7 | 1 | 12 |
| 3 | 3 | 9 | 1 | 3 | 9 | 1 | 3 | 9 | 1 | 3 | 9 | 1 | 3 |
| 4 | 4 | 3 | 12 | 9 | 10 | 1 | 4 | 3 | 12 | 9 | 10 | 1 | 6 |
| 5 | 5 | 12 | 8 | 1 | 5 | 12 | 8 | 1 | 5 | 12 | 8 | 1 | 4 |
| 6 | 6 | 10 | 8 | 9 | 2 | 12 | 7 | 3 | 5 | 4 | 11 | 1 | 12 |
| 7 | 7 | 10 | 5 | 9 | 11 | 12 | 6 | 3 | 8 | 4 | 2 | 1 | 12 |
| 8 | 8 | 12 | 5 | 1 | 8 | 12 | 5 | 1 | 8 | 12 | 5 | 1 | 4 |
| 9 | 9 | 3 | 1 | 9 | 3 | 1 | 9 | 3 | 1 | 9 | 3 | 1 | 3 |
| 10 | 10 | 9 | 12 | 3 | 4 | 1 | 10 | 9 | 12 | 3 | 4 | 1 | 6 |
| 11 | 11 | 4 | 5 | 3 | 7 | 12 | 2 | 9 | 8 | 10 | 6 | 1 | 12 |
| 12 | 12 | 1 | 12 | 1 | 12 | 1 | 12 | 1 | 12 | 1 | 12 | 1 | 2 |

| $f_{i,j}(0,3)$ | $f_{i,j}(1,3)$ | $f_{i,j}(2,3)$ | $f_{i,j}(3,3)$ |
|---|---|---|---|
| $f_{i,j}(0,2)$ | $f_{i,j}(1,2)$ | $f_{i,j}(2,2)+\delta$ | $f_{i,j}(3,2)$ |
| $f_{i,j}(0,1)$ | $f_{i,j}(1,1)$ | $f_{i,j}(2,1)$ | $f_{i,j}(3,1)$ |
| $f_{i,j}(0,0)$ | $f_{i,j}(1,0)$ | $f_{i,j}(2,0)$ | $f_{i,j}(3,0)$ |

↑ INTT $H_{i,j}(x,y)$

| $F_{i,j}(0,3)-\delta$ | $F_{i,j}(1,3)+\delta$ | $F_{i,j}(2,3)-\delta$ | $F_{i,j}(3,3)+\delta$ |
|---|---|---|---|
| $F_{i,j}(0,2)+\delta$ | $F_{i,j}(1,2)-\delta$ | $F_{i,j}(2,2)+\delta$ | $F_{i,j}(3,2)-\delta$ |
| $F_{i,j}(0,1)-\delta$ | $F_{i,j}(1,1)+\delta$ | $F_{i,j}(2,1)-\delta$ | $F_{i,j}(3,1)+\delta$ |
| $F_{i,j}(0,0)+\delta$ | $F_{i,j}(1,0)-\delta$ | $F_{i,j}(2,0)+\delta$ | $F_{i,j}(3,0)-\delta$ |

FIG. 8

UNAUTHORIZED-ALTERATION DETECTING METHOD, UNAUTHORIZED-ALTERATION DETECTING PROGRAM, AND RECORDING MEDIUM HAVING RECORDED THE PROGRAM

CROSS - REFERENCE TO RELATED APPLICATIONS

The present Application is based on International Application No. PCT/JP2003/013772, filed on Oct. 28, 2003, which in turn corresponds to JP 2002-315391 filed on Oct. 30, 2002, and priority is hereby claimed under 35 USC §119 based on these applications. Each of these applications are hereby incorporated by reference in their entirety into the present application.

TECHNICAL FIELD

The present invention relates to unauthorized-alteration detection methods, unauthorized-alteration detecting programs, and recording media having recorded the programs, and more particularly, to a technology for detecting a position where an image is altered in an unauthorized manner, which uses fragile electronic watermarking employing number theoretic transform.

BACKGROUND ART

In general, images used for official documents, such as corroborating photographs, need to have originality sufficiently ensured. Since digital images can be altered relatively easily without any strange appearance, however, the digital images have insufficient admissibility of evidence in some cases. Therefore, technologies for ensuring the originality of digital images and for detecting unauthorized alteration of digital images are demanded. As a method for achieving these objects, electronic signatures which use a hash function have been conventionally examined, but electronic signatures are not intended to detect a position where unauthorized alteration was made.

As a method for detecting a position where unauthorized alteration was made, electronic watermarking has attracted attention conventionally. Electronic watermarking is classified according to characteristics into two types, "robust" and "fragile". Robust electronic watermarking is robust against attacks and is mainly used for copyright protection. To detect a position where unauthorized alteration was made, fragile electronic watermarking is used. Fragile electronic watermarking is very sensitive to image processing. During a process to detect unauthorized alteration, an electronic watermark which has been changed somehow can be identified to determine a position where an unauthorized alteration was made. Several references are listed below.

Japanese Unexamined Patent Application Publication No. 2002-44429

Japanese Unexamined Patent Application Publication No. 2002-201703

Hideaki Tamori, Naoshi Aoki, and Tsuyoshi Yamamoto, "Electronic Watermarking Technique Capable of Detecting Unauthorized Alteration, Using Number Theoretic Transform," Technical Research Report of the Institute of Electronics, Information and Communication Engineers, IE2001-33, pp. 105-110, July, 2001

Hideaki Tamori, Naoshi Aoki, and Tsuyoshi Yamamoto, "Unauthorized-Alteration-Position Detection and Unauthorized-Alteration Correction in Still Images, Using Fragile Electronic Watermarking with Number Theoretic Transform," Technical Research Report of the Institute of Electronics, Information and Communication Engineers, IE2002-45, pp. 19-24, July, 2002

H. Tamori, N. Aoki, and T. Yamamoto, "A Fragile Digital Watermarking Technique by Number Theoretic Transform," IEICE Trans. Fundamentals, August 2002

DISCLOSURE OF INVENTION

In conventional fragile watermarking methods intended to detect a position where unauthorized alteration was made, as described above, a hash value or a parity value obtained from digital contents is embedded in a bit plane in usual cases. These methods, however, have a security problem in some cases when their algorithms are disclosed. Specific unauthorized alteration cannot be detected, for example, in a case in which a plurality of different embedding-applied images are synthesized to generate an image altered in an unauthorized manner.

In robust electronic watermarking, there have been proposed many methods having relatively high security levels, which use orthogonal transform such as discrete Fourier transform. It is thought that, when such robust electronic watermarking methods are applied to fragile electronic watermarking, it is expected that security will be further improved. Therefore, the inventors have examined a fragile electronic watermarking method which uses an orthogonal transform called number theoretic transform (NTT). The number theoretic transform has a fragile characteristic in which, even if a slight change is applied to a sequence, a transform result shows a large difference from when the sequence is transformed before the slight change is applied.

In view of the foregoing points, an object of the present invention is to propose an unauthorized-alteration detecting method, an unauthorized-alteration detecting program, and a recording medium having recorded the program, which use a fragile electronic watermarking method employing the number theoretic transform, to which a robust electronic watermarking method employing an orthogonal transform has been applied. Another object of the present invention is to provide an unauthorized-alteration detecting method and others capable of easily and visually checking whether unauthorized alteration was made and the position thereof.

In conventional electronic watermarking methods employing the number theoretic transform, signature information is embedded by replacing a relatively small range of two lowest order bits or so in the image bits of the original image. In contrast, an object of the present invention is to further enhance security by embedding signature information by using all or a desired large range of pixel bits of the original image. In the conventional methods employing the number theoretic transform, signature information is embedded by multiplying (convoluting) into a number theoretic transform domain. In contrast, an object of the present invention is to increase a calculation speed by embedding signature information by additions.

A first solving means of the present invention provides an unauthorized-alteration detecting method including the following steps and a recording medium having recorded an unauthorized-alteration detecting program for making a computer execute each of the following steps, the following steps including:

a step in which a processing section specifies a modulus P, an order N, and a root $\alpha$, which are parameters of number theoretic transform;

a step in which the processing section reads from a storage section an original-image block $f_{i,j}(x, y)$ obtained by block-dividing an original image [f] to which embedding is to be applied;

a step in which the processing section uses the modulus P, the order N, and the root α specified, to apply the number theoretic transform to the original-image block $f_{i,j}(x, y)$ to calculate the number-theoretic-transformed block $F_{i,j}(x, y)$ of the original-image block;

a step in which the processing section determines an embedding position (x', y') of a signature image in each block according to a predetermined randomizing function;

a step in which the processing section reads from the storage section a pixel value $g_{i,j}$ of the signature image to be embedded;

a step in which the processing section obtains an embedding amount δ in each block from the number-theoretic-transformed block $F_{i,j}(x', y')$ of the original-image block at the embedding position, the pixel value $g_{i,j}$ of the signature image, and embedding strength ε;

a step in which the processing section adds or subtracts the embedding amount δ to or from the number-theoretic-transformed block $F_{i,j}(x, y)$ of the original-image block, based on (x, y) to obtain the number-theoretic-transformed block $H_{i,j}(x, y)$ of an embedding-applied-image block;

a step in which the processing section applies inverse number theoretic transform to the number-theoretic-transformed block $H_{i,j}(x, y)$ to obtain the embedding-applied-image block $h_{i,j}(x, y)$; and a step in which the processing section obtains the embedding-applied-image block $h_{i,j}(x, y)$ for each of all (i, j) blocks or a desired range of (i, j) blocks to obtain an embedding-applied image [h], and stores it in the storage section and/or outputs it from an output section or an interface.

A second solving means of the present invention provides an unauthorized-alteration detecting method including the following steps and a recording medium having recorded an unauthorized-alteration detecting program for making a computer execute each of the following steps, the following steps including:

a step in which a processing section reads from a storage section, an input section, or an interface an embedding-applied-image block $h_{i,j}(x, y)$ obtained by block-dividing an embedding-applied image [h];

a step in which the processing section specifies a modulus P, an order N, and a root α, which are parameters of number theoretic transform;

a step in which the processing section applies the number theoretic transform to the embedding-applied-image block $h_{i,j}(x, y)$ to calculate the number-theoretic-transformed block $H_{i,j}(x, y)$ of the embedding-applied-image block;

a step in which the processing section determines an extraction position (x', y') corresponding to an embedding position of a signature image according to a predetermined randomizing function;

a step in which the processing section obtains a remainder by dividing the number-theoretic-transformed block $H_{i,j}(x', y')$ at the extraction position by embedding strength ε to extract a pixel value $g_{i,j}$ of the signature image; and a step in which the processing section obtains the pixel value $g_{i,j}$ of the signature image in each of all (i, j) blocks or a desired range of (i, j) blocks to obtain the signature image [g], and stores it in the storage section and/or outputs it from a display section, an output section, or an interface.

A third solving means of the present invention provides an unauthorized-alteration detecting method including the following steps and a recording medium having recorded an unauthorized-alteration detecting program for making a computer execute each of the following steps, which include an unauthorized-alteration detecting method comprising an embedding process for embedding a signature image into an original image and an extraction process for extracting the signature image, wherein the embedding process comprises:

a step in which a processing section specifies a modulus P, an order N, and a root α, which are parameters of number theoretic transform;

a step in which the processing section reads from a storage section an original-image block $f_{i,j}(x, y)$ obtained by block-dividing an original image [f] to which embedding is to be applied;

a step in which the processing section uses the modulus P, the order N, and the root α specified, to apply the number theoretic transform to the original-image block $f_{i,j}(x, y)$ to calculate the number-theoretic-transformed block $F_{i,j}(x, y)$ of the original-image block;

a step in which the processing section determines an embedding position (x', y') of a signature image in each block according to a predetermined randomizing function;

a step in which the processing section reads from the storage section a pixel value $g_{i,j}$ of the signature image to be embedded;

a step in which the processing section obtains an embedding amount δ in each block from the number-theoretic-transformed block $F_{i,j}(x', y')$ of the original-image block at the embedding position, the pixel value $g_{i,j}$ of the signature image, and embedding strength ε;

a step in which the processing section adds or subtracts the embedding amount δ to or from the number-theoretic-transformed block $F_{i,j}(x, y)$ of the original-image block, based on (x, y) to obtain the number-theoretic-transformed block $H_{i,j}(x, y)$ of an embedding-applied-image block;

a step in which the processing section applies inverse number theoretic transform to the number-theoretic-transformed block $H_{i,j}(x, y)$ to obtain the embedding-applied-image block $h_{i,j}(x, y)$; and a step in which the processing section obtains the embedding-applied-image block $h_{i,j}(x, y)$ for each of all (i, j) blocks or a desired range of (i, j) blocks to obtain an embedding-applied image [h], and stores it in the storage section and/or outputs it from an output section or an interface, and the extraction process comprises:

a step in which the processing section reads from the storage section, the input section, or the interface an embedding-applied-image block $h_{i,j}(x, y)$ obtained by block-dividing an embedding-applied image [h];

a step in which the processing section specifies a modulus P, an order N, and a root α, which are parameters of number theoretic transform;

a step in which the processing section applies the number theoretic transform to the embedding-applied-image block $h_{i,j}(x, y)$ to calculate the number-theoretic-transformed block $H_{i,j}(x, y)$ of the embedding-applied-image block;

a step in which the processing section determines an extraction position (x', y') corresponding to an embedding position of a signature image according to a predetermined randomizing function;

a step in which the processing section obtains a remainder by dividing the number-theoretic-transformed block $H_{i,j}(x', y')$ at the extraction position by embedding strength ε to extract a pixel value $g_{i,j}$ of the signature image; and a step in which the processing section obtains the pixel value $g_{i,j}$ of the signature image in each of all (i, j) blocks or a desired range of (i, j) blocks to obtain the signature image

[g], and stores it in the storage section and/or outputs it from a display section, the output section, or the interface.

BRIEF DESCRIPTION OF THE DRAWINGS

FIG. 1 is an explanatory view of $y^x$ (mod 13) of a prime number 13.

FIG. 8 is an explanatory view of how embedding affects pixel values.

DESCRIPTION OF THE PREFERRED EMBODIMENTS

1. Number Theoretic Transform 1.1 Outline

Figure 2:
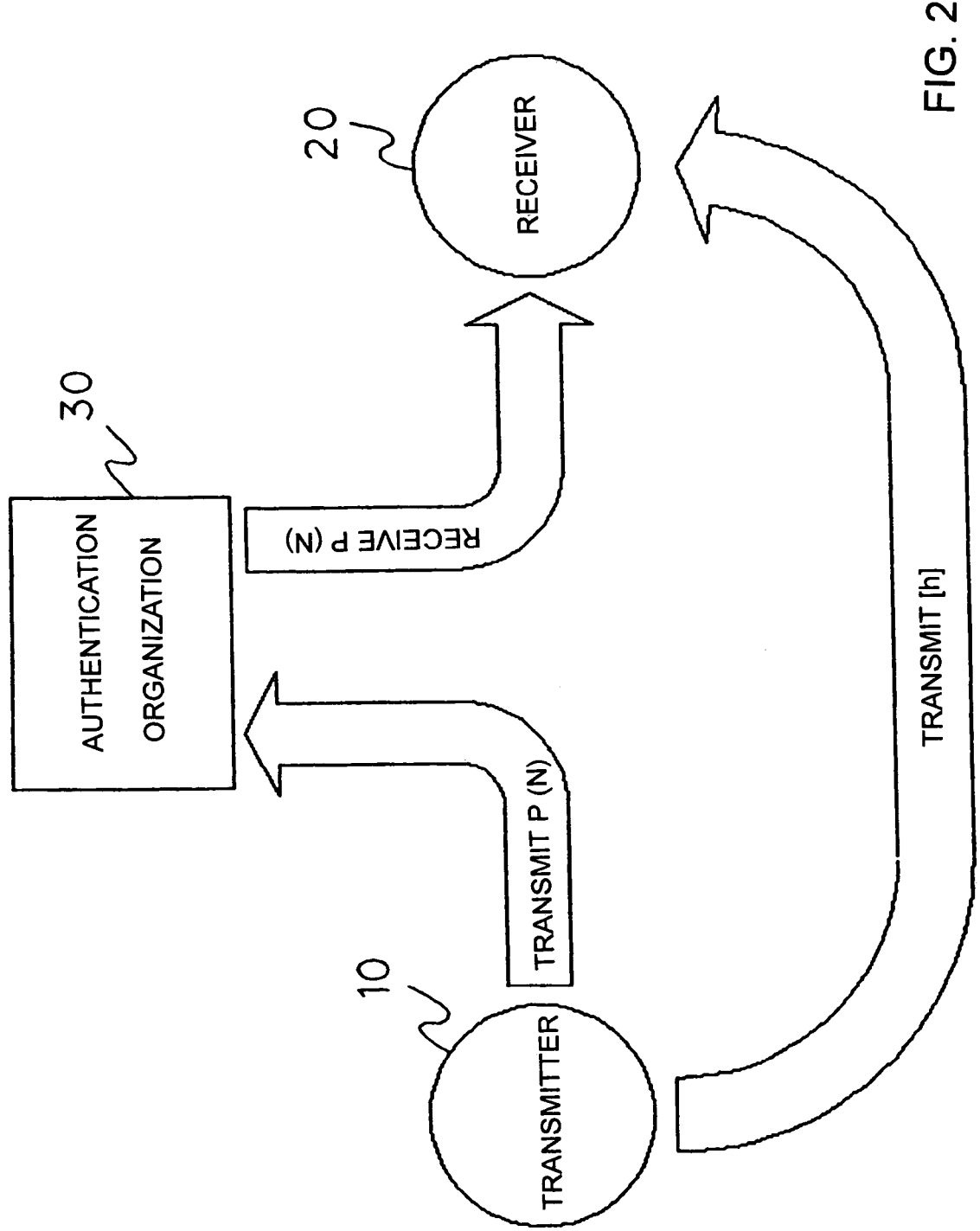
FIG. 2 is an outline view of a system configuration.

The number theoretic transform will be first described. If necessary, refer to the following references for the number theoretic transform.

J. H. McClellan and C. M. Rader, "Number Theory in Digital Signal Processing," Prentice-Hall, New Jersey, 1979.

"Handbook of Digital Signal Processing," edited by the Institute of Electronics, Information and Communication Engineers, published by Ohmsha, Ltd., Tokyo, 1993.

"Mathematical Basics of Encryption," written by S. C. Coutinho and translated by Hing Lin, Springer-Verlag Tokyo Ltd., Tokyo, 2001.

"Fast Fourier Transform Algorithm," written by H. J. Nussbaumer and translated by Masahiko Sagawa and Hitoshi Homma, Science Press, Inc., Tokyo, 1989.

Takatsugu Taniogi, "Algorithm and Parallel Processing," Digital Signal Processing Library No. 4, Corona Publishing Co. Ltd., Tokyo, 2000.

Yoshinao Aoki, "Wave Signal Processing," Morikita Shuppan Co., Ltd., Tokyo, 1986.

It is assumed that parameters P and $\alpha$ are positive integers and a parameter N is the minimum positive integer which satisfies $\alpha^N = 1$ (mod P). When $\phi(P)$ indicates an Euler function, $\alpha$ which satisfies $N = \phi(P)$ is called a primitive root of an order N, and $\alpha$ which satisfies $N < \phi(P)$ is called a root of the order N. $\phi(P)$ expresses the number of integers smaller than P and mutually prime with respect to P.

The following transform pair which uses $\alpha$ will be examined.

$$X(k) = \sum_{n=0}^{N-1} x(n)\alpha^{kn} \pmod{P} \qquad (1)$$

$$x(n) = \frac{1}{N}\sum_{k=0}^{N-1} X(k)\alpha^{-kn} \pmod{P} \qquad (2)$$

Since the foregoing calculations can be performed in the remainder system with respect to a modulus of P, an round-off error does not occur at all. In an application to electronic watermarking, if P is made confidential, since a third party cannot obtain an expected transform result due to the characteristic of the number theoretic transform, P can be used as key information. In the number theoretic transform, a Mersenne number or a Fermat number is typically used as P (for example, refer to "Handbook of Digital Signal Processing," edited by the Institute of Electronics, Information and Communication Engineers, published by Ohmsha, Ltd., Tokyo, 1993 and others). There is, however, a severe limitation. The number of numbers which can be selected is small, and using as the key information is inappropriate in some cases. Therefore, a technique is applied in which P can be any compound number generated by a power of a prime number.

It is assumed that P is expressed by the following expression with p being a prime number.

$$P = p_1^{r_1} p_2^{r_2} \cdots p_m^{r_m} \qquad (3)$$

The order N is first selected among positive integers satisfying the following expression.

$$N | GCD[(p_1-1),(p_2-1),\ldots,(p_m-1)] \qquad (4)$$

A root $\alpha_{1,m}$ of the order N modulo $p_m$ is calculated, and then, a root $\alpha_{2,m}$ of the order N is obtained by the following expression.

$$\alpha_{2,m} = \alpha_{1,m}^{p_m^{r_m-1}} \pmod{p_m^{r_m}} \qquad (5)$$

Then, a root $\alpha$ of the order N modulo P can be obtained from $\alpha_{2,m}$ by the Chinese remainder theorem (for example, refer to "Fast Fourier Transform Algorithm," written by H. J. Nussbaumer and translated by Masahiko Sagawa and Hitoshi Homma, Science Press, Inc., Tokyo, 1989, and others.)

Generally, to extend the range of numbers which can be handled in calculations in a remainder system, sets of remainder systems having different moduli are used and calculation results are obtained in units of sets having the moduli in some cases. The Chinese remainder theorem is to obtain a unique number in a certain system of notation from the sets and can be expressed in the following way (refer to Yoshinao Aoki, "Wave Signal Processing," Morikita Shuppan Co., Ltd., Apr. 3, 1986).

[Theorem] Assuming that moduli $m_i$ (i=1, 2, . . . , 1) are positive integers prime to each other and $M = m_1 m_2 \ldots m_l$, a positive integer "a" ($0 < a \leq (M-1)$) which satisfies the following expression $$<a>_{m_i} = r_i (i=1, 2, \ldots, 1)$$

(where $r_i$ are remainders of "a" with respect to the moduli $m_i$)

is uniquely given by the following expression.

$$a = \Sigma d_i d_i^{-1} r_i \pmod{M}$$

where, $\Sigma$ is the sum for i=1 to l, $d_i = M/m_i$, and $d_i^{-1} = (<d_i>_{m_i})^{-1}$ (mod $m_i$) $((<d_i>m_i)^{-1}$ are multiplication inverses at moduli $m_i$).

1.2 EXAMPLES

For example, number theoretic transform with $P = 61009 = 13^2 \times 19^2$ will be examined. Since GCD[12, 18]=6, N is selected from N|6=[1, 2, 3, 6]. N=3 is employed here. Next, roots of an order 3 with respect to moduli 13 and 19 are calculated. When they are called $\alpha_{1,1}$ and $\alpha_{1,2}$, $\alpha_{1,1} = 3$ and $\alpha_{1,2} = 7$. Therefore, when roots of an order 3 with respect to moduli $13^2$ and $19^2$ are called $\alpha_{2,1}$ and $\alpha_{2,2}$, they are calculated as follows.

$$\alpha_{2,1} = 3^{13^{2-1}} = 146 \pmod{13^2}$$

$$\alpha_{2,2} = 7^{19^{2-1}} = 292 \pmod{19^2}$$

Then, according to the Chinese remainder theorem, which is well known, a root $\alpha$ of an order 3 with respect to a modulus 61009 is obtained as $\alpha = 653$.

FIG. 1 shows an explanatory view of $y^x$ (mod 13) of a prime 13.

For example, how to find a rood of an order 3 with respect to a modulus 13 will be examined. Vertically indicated is "y" and horizontally indicated is "x". When "1" appears at an interval of N, "y" is an order N (3 in this case) with respect to a modulus 13. Since "3" appears at an interval of three when y is 3 or 9, the roots are 3 and 9. If the minimum number is selected among a plurality of roots, for example, the root is 3. For general issues of the number theoretic transform, refer to the following website or others.

http://fox.zero.ad.jp/~zat25960/math/number/index.htm

According to the foregoing description, an example case in which the number theoretic transform is applied to a sequence $x = [10, 20, 30]^T$ at N=3 will be examined. Expressions (1) and (2) can be expressed in the following way in matrix notation.

$$X = [T]x$$

$$x = [T]^{-1}X$$

where, $$X = [X(0), X(1), X(2)]^T$$

$$x = [x(0), x(1), x(2)]^T$$

A transformation matrix [T] is expressed below.

$$[T] = [\alpha^{kn}]$$

$$= \begin{bmatrix} 1 & 1 & 1 \\ 1 & 653 & 653^2 \\ 1 & 653^2 & 653^4 \end{bmatrix}$$

$$= \begin{bmatrix} 1 & 1 & 1 \\ 1 & 653 & 60355 \\ 1 & 60355 & 653 \end{bmatrix} \pmod{61009}$$

An inverse transformation matrix $[T]^{-1}$ is expressed below.

$$[T]^{-1} = N^{-1}[\alpha^{-kn}]$$

$$= 3^{-1} \begin{bmatrix} 1 & 1 & 1 \\ 1 & 653^{-1} & 653^{-2} \\ 1 & 653^{-2} & 653^{-4} \end{bmatrix}$$

$$= \begin{bmatrix} 40673 & 40673 & 40673 \\ 40673 & 60791 & 20554 \\ 40673 & 20554 & 60791 \end{bmatrix} \pmod{61009}$$

When the number theoretic transform is applied to x, the following is obtained.

$$X = \begin{bmatrix} 1 & 1 & 1 \\ 1 & 653 & 60355 \\ 1 & 60355 & 653 \end{bmatrix} \cdot \begin{bmatrix} 10 \\ 20 \\ 30 \end{bmatrix}$$

$$= [60, 54459, 6520]^T \pmod{61009}$$

When the inverse transform is applied to X by using $[T]^{-1}$, the following is obtained.

$$x = [T]^{-1}X = [10, 20, 30]^T \pmod{61009}$$

It is assumed here, for example, that the transformed sequence $X = [60, 54459, 6520]^T$ is altered in an unauthorized manner to $X' = [61, 54459, 6521]^T$. The output x' of inverse transform is shown below, which is very different from "x".

$$x' = [T]^{-1}X' = [11, 238, 40485]^T \pmod{61009}$$

This result is obtained from a characteristic of the number theoretic transform, no round-off error, and it is effective to detect unauthorized alteration.

2. Hardware

FIG. 2 shows an outline view of a system configuration. This system includes a transmitter computer 10, a receiver computer 20, and an authentication-organization computer 30. The transmitter computer 10 sends image information [h] in which signature information has been embedded by electronic watermarking to the receiver computer 20. Signature data [g] is determined in advance between the transmitter computer 10 and the receiver computer 20. The transmitter computer 10 sends key information P and further, if necessary, an order N to the authentication-organization computer 30. The receiver computer 20 obtains the key information P and further, if necessary, N from the authentication-organization computer 30.

A system other than that described above may be configured such that the authentication-organization computer 30 is omitted, and [h], P, and further, if necessary, N are directly transferred between the transmitter computer 10 and the receiver transmitter 20.

The following means may be, for example, used as transfer means for transmitting [h], P, and N from the transmitter to the receiver. Since [h] may be made public, the transmitter computer 10 may directly transmit [h] to the receiver computer 20 by e-mail. However, because the key information P is a secret key, it is better in terms of security that the key information is encrypted by RSA or other methods and then transmitted from the transmitter computer 10 to the receiver computer 20 or to the authentication-organization computer 30. When this system is used in a digital camera, for example, one possibility is that the digital camera directly transmits the key information to the authentication organization. In this case, without using e-mail, an encrypted file can be directly transmitted by packet switching or circuit switching. The above description also applies to a case in which the transmitter computer 10 receives the key information from the receiver computer 20 or from the authentication-organization computer 30.

Figure 3:
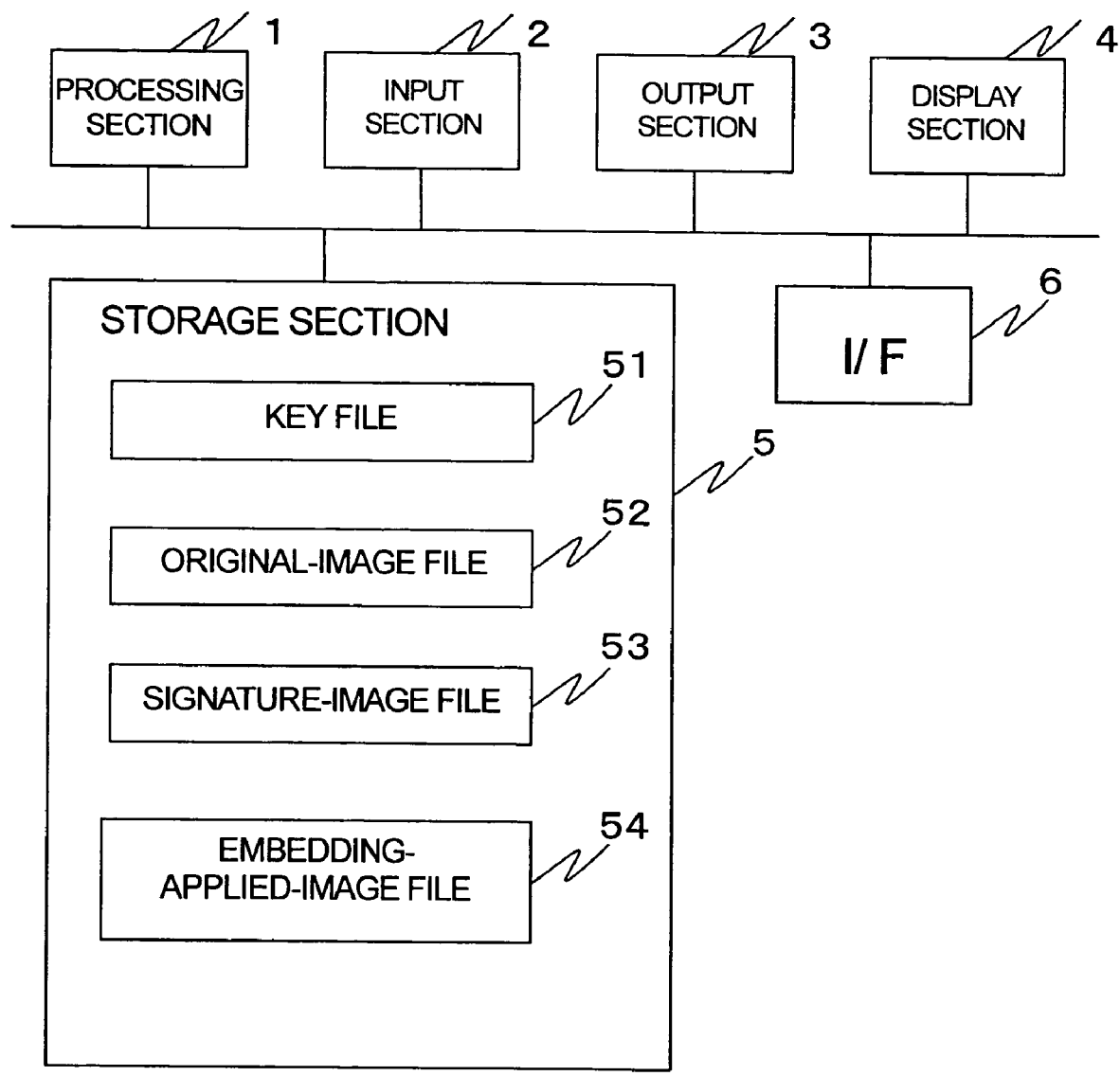
FIG. 3 is a structural view of an unauthorized-alteration-position detecting apparatus.

FIG. 3 is a structural view of an unauthorized-alteration-position detecting apparatus.

The apparatus includes a processing section 1, which is a central processing unit (CPU), an input section 2, an output section 3, a display section 4, a storage section 5, and an interface 6. The processing section 1, the input section 2, the output section 3, the display section 4, and the storage section 5 are connected by appropriate connection means, such as a star connection or a bus connection. The storage section 5 has a key file 51 for storing parameters used in the number theoretic transform, an original-image file 52 for storing an original image [f], a signature-image file 53 for storing a signature-image file [g], and an embedding-applied-image file 54 for storing an embedding-applied-image file [h]. The storage section further stores in advance randomizing functions $r_{x'}$ and $r_{y'}$ and embedding strength $\epsilon$, described later. The interface 6 is connected to various networks such as the Internet and a mobile communication network, and transmits and receives information to and from other computers by radio or by wire.

3. Unauthorized-Alteration-Position Detection 3.1 Robust Electronic Watermarking Method Using Orthogonal Transform For reference, an electronic watermarking method using discrete Fourier transform will be described first.

Figure 4:
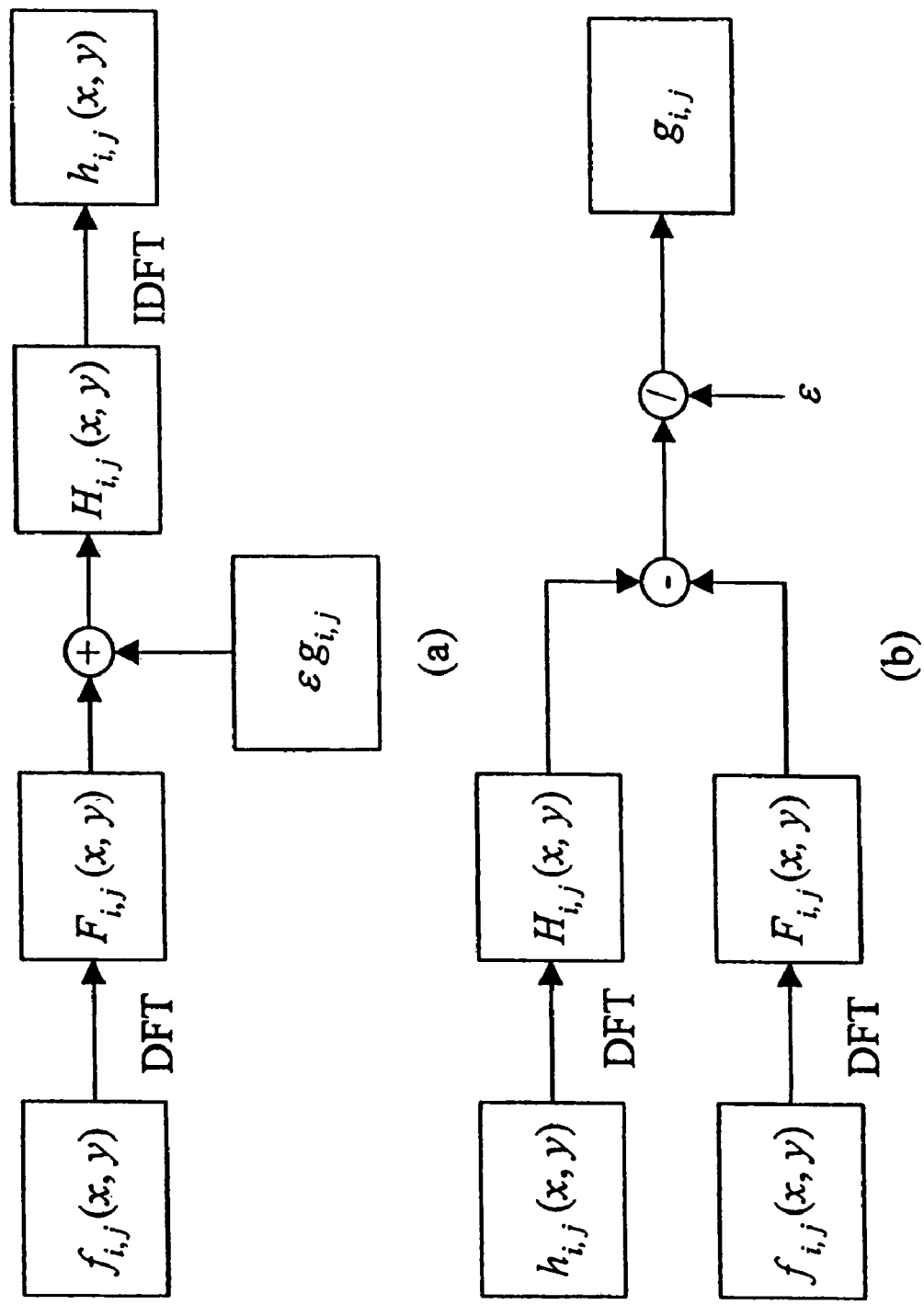
FIG. 4 is an explanatory view of electronic watermarking which employs discrete Fourier transform.

FIG. 4 is an explanatory view showing an example electronic watermarking method using discrete Fourier transform. FIG. 4(a) shows an embedding process and FIG. 4(b) shows an extraction process.

In robust electronic watermarking, many techniques have been reported which embed signature information in a spatial-frequency domain obtained by orthogonal transform. As an example of such electronic watermarking methods, a technique which uses discrete Fourier transform, as shown in the figure, will be described below.

In the embedding process, the processing section 1 first divides an original image [f] (KN×LN pixels, 8-bit gradations) into blocks each having N by N pixels. Each of the obtained blocks is called $f_{i,j}(x, y)$, where i and j indicate the position of the block in the image, and x and y indicate the coordinates of a pixel in the block (i=0, 1, . . . , K−1, j=0, 1, . . . , L−1, x and y=0, 1, . . . , N−1). Then, the processing section 1 applies two-dimensional Fourier transform to $f_{i,j}(x, y)$, and the transform result is expressed as $F_{i,j}(x, y)$.

The processing section 1 prepares a signature image [g] (K by L pixels, 1-bit gradation) by reading it from the storage section 5 or by other means. Each pixel value of [g] is called $g_{i,j}$ (=0 or 1), and i and j indicate the coordinate of a pixel in [g], and correspond to i and j in $f_{i,j}(x, y)$. The processing section 1 adds $g_{i,j}$ to a low-frequency component of $F_{i,j}(x, y)$ to obtain the Fourier transformed block $H_{i,j}(x, y)$ of an embedding-applied block. More specifically, when e indicates embedding strength and (x', y') indicates the coordinate of an element to be embedded, the following expression is obtained.

$$H_{i,j}(x, y) = \begin{cases} F_{i,j}(x, y) + \varepsilon g_{i,j} & x = x', y = y' \\ F_{i,j}(x, y) & \text{otherwise} \end{cases} \quad (6)$$

When the user specifies $\epsilon$ and (x', y') uniquely in advance in common to the embedding process and the extraction process, these factors are keys to extract the embedded image. Then, the processing section 1 applies inverse Fourier transform to $H_{i,j}(x, y)$ to obtain an embedding-applied block $h_{i,j}(x, y)$. The processing section 1 applies the foregoing operations to all blocks to obtain an embedding-applied image [h].

The processing section 1 obtains the difference between $H_{i,j}(x', y')$ and $F_{i,j}(x', y')$ to implement the extraction process for the signature information. In other words, $g_{i,j}$ is obtained by the following expression.

$$g_{i,j} = \varepsilon^{-1} \{H_{i,j}(x', y') - F_{i,j}(x', y')\} \quad (7)$$

In techniques such as that described above, since signature information is embedded in a low-frequency component, the signature information is not susceptible to be broken by attacks such as minor image processing, and the techniques are robust. For this reason, many techniques which use a spatial frequency domain obtained by orthogonal transform are used in robust electronic watermarking intended to protect copyrights.

3.2 Fragile Electronic Watermarking Method Using Number Theoretic Transform

Figure 5:
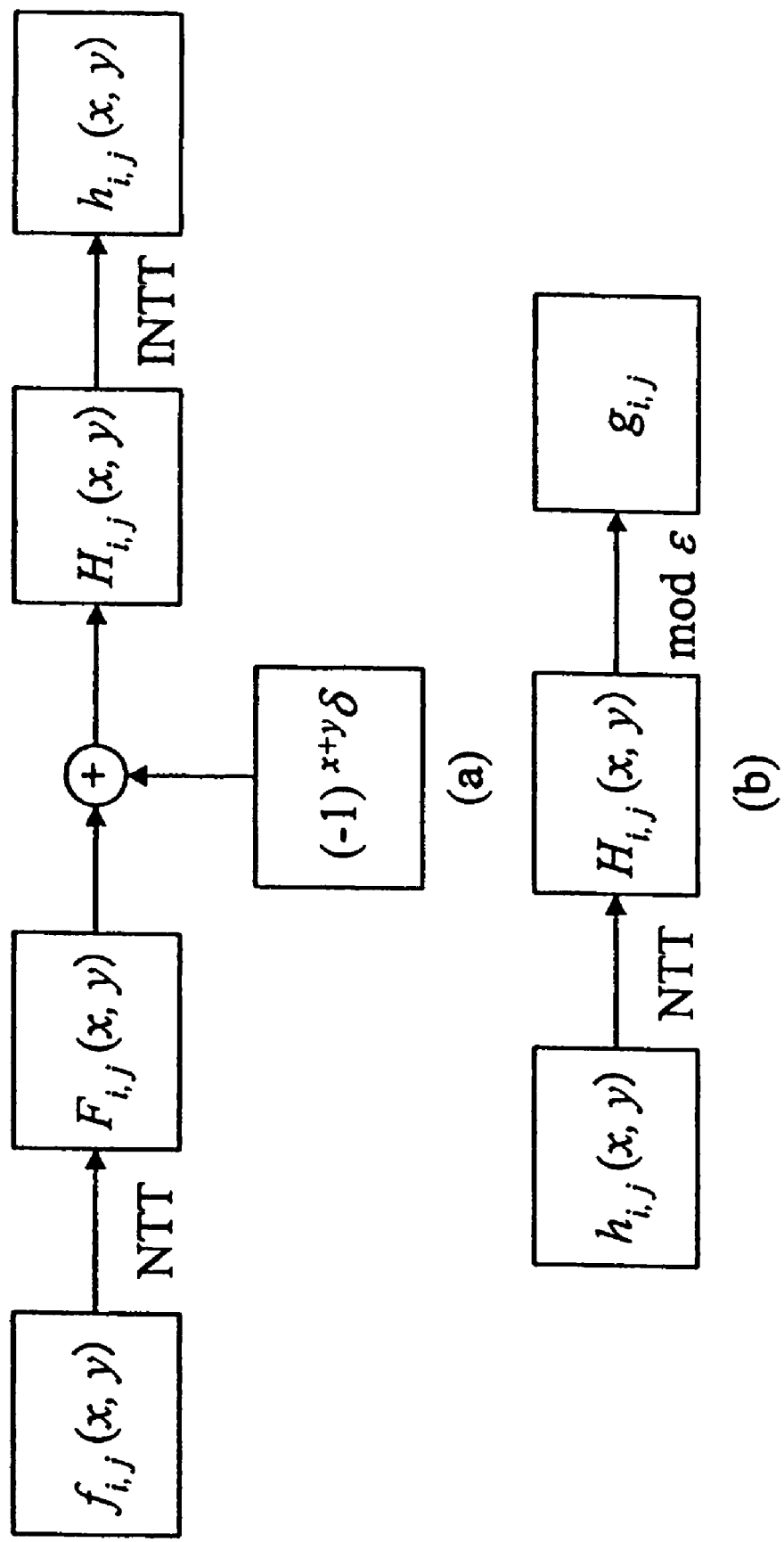
FIG. 5 is an explanatory view of fragile electronic watermarking which employs number theoretic transform.

FIG. 5 is an explanatory view showing a fragile electronic watermarking method using the number theoretic transform. FIG. 5(a) shows an embedding process and FIG. 5(b) shows an extraction process.

Although the number theoretic transform is the same type of orthogonal transform as the discrete Fourier transform, since the transform domain does not have any physical meaning unlike the frequency domain, the above description in "3.1 Robust electronic watermarking method using orthogonal transform" cannot be applied as it is. In addition, the technique described in 3.1 needs the original image to extract the signature information, it may be impractical for the purpose of detecting an unauthorized-alteration position. With these issues taken into account, a technique shown in the figure will be proposed here.

3.2.1 Embedding Process

Figure 6:
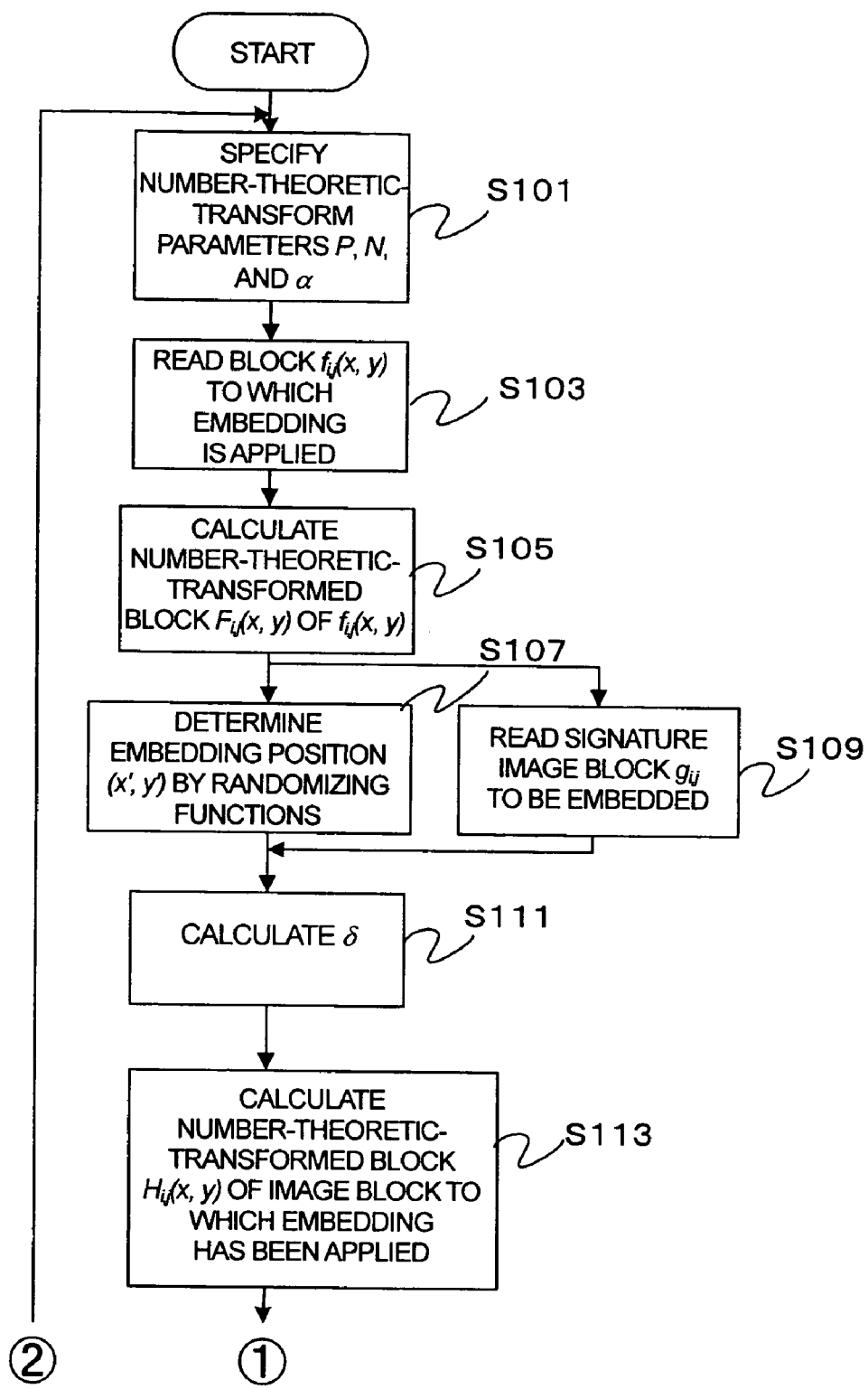
FIG. 6 is a flowchart (1) of an embedding process.
Figure 7:
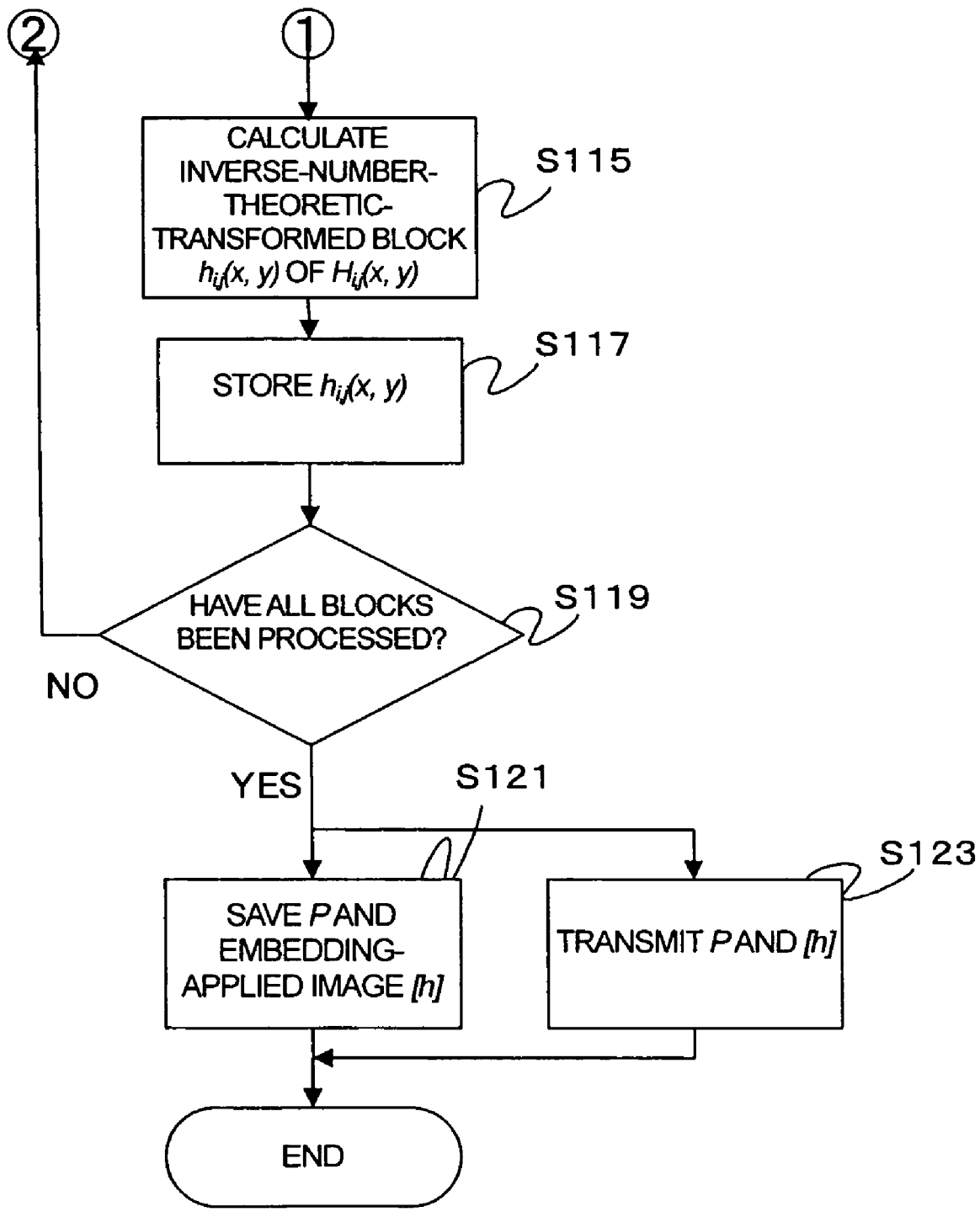
FIG. 7 is a flowchart (2) of the embedding process.

FIG. 6 and FIG. 7 shows flowcharts (1) and (2) of the embedding process.

When the embedding process is started, the processing section 1 specifies a modulus P, an order N, and a root α, which are parameters of the number theoretic transform (S101).

P is stored in advance in the key file 51 before the process, for example, by the user with the use of the input section 2 or by the processing section 1 by determining a random value with the use of thermal noise or others. The processing section 1 refers to the key file 51 to specify P. P can be any compound number generated by powers of prime numbers as shown in expression (3). To handle all integers which pixel values can be, in remainder calculations, the processing section 1 selects an integer larger than the maximum number of pixel values, as an example.

After P is determined, the processing section 1 selects N according to expression (4). The processing section 1 refers to the key file 51 or performs a calculation by the use of expression (4) or others to specify N. N may be stored in advance in the key file 51 by the input section 2. Alternatively, the processing section 1 may obtain a candidate depending on P by expression (4), and if there are a plurality of candidates, the processing section 1 may select one of them. Since N indicates a block size, if it is very large, a correct position cannot be detected in some case. As an example, N is appropriately set to 2 or 4. The user can select any number or the system can determine in advance an appropriate selection method.

When P and N are determined, the processing section 1 calculates the root α by expression (5), the Chinese remainder theorem, and others to obtain the root α uniquely. As long as P and N are unknown, the extraction process, described later, cannot be performed. Therefore, P or both P and N are keys for detecting unauthorized alteration.

Next, the processing section 1 reads an original-image block $f_{i,j}(x, y)$ to which embedding is to be applied, which are obtained by dividing an original image [f] into blocks, from the original-image file 52 of the storage section 5 (S103). In the same way as described above, the original image [f] (KN×LN pixels) is divided into K by L blocks each having N by N pixels. Each of the obtained blocks is called $f_{i,j}(x, y)$, where i and j indicate the position of the block in the image, and x and y indicate the coordinates of a pixel in the block (i=0, 1, ..., K−1, j=0, 1, ..., L−1, x and y=0, 1, ..., N−1).

Then, the processing section 1 calculates a two-dimensional Fourier transformed, original-image block $F_{i,j}(x, y)$ of the original-image block $f_{i,j}(x, y)$ by the use of P, N, and α specified in step S101 according to expressions (1) and (2) (S105).

Next, the processing section 1 obtains the number-theoretic-transformed block $H_{i,j}(x, y)$ of an embedding-applied image block by using the following expression in a way described in details below.

$$H_{i,j}(x, y) = F_{i,j}(x, y) + (-1)^{x+y} \delta \quad (8)$$

where, δ is an integer satisfying expression (9) and having the minimum absolute value.

$$F_{i,j}(x', y') + \delta \equiv g_{i,j} \pmod{\epsilon} \quad (9)$$

The user can select any embedding strength ε in this case. When signature information has one bit, for example, the strength needs to be an integer equal to 2 or larger. It is preferred with the deterioration of the embedding-applied image taken into account that a small-value be used. Since the transform domain does not have any physical meaning in the number theoretic transform, (x', y') are determined by the following random functions.

The processing section 1 first refers to the randomizing functions $r_{x'}$ and $r_{y'}$ in the storage section 5 to determine an embedding position (x', y') random in each block (S107). The randomizing functions $r_{x'}$ and $r_{y'}$ can determine an embedding position (x', y') uniquely, and can be specified, for example, as follows.

$$x' = r_{x'}(P, i, j, f_{i,l}(0, 0)) \quad (10)$$

$$y' = r_{y'}(P, i, j, f_{i,l}(0, 0)) \quad (11)$$

$$l = j - 1 \pmod{L} \quad (12)$$

In this case, the randomizing functions include an original-image block $f_{i,l}(0, 0)$ to enhance security. Details thereof will be described in 5.(7). An (0, 0) element of the left adjacent block is $f_{i,l}(0, 0)$. In the embedding process, since the (0, 0) element is not changed, if the same $r_{x'}$ and $r_{y'}$ are also specified in the extraction process, the same values can be obtained from the randomizing functions. Instead of the element in the left adjacent block, an element in the right adjacent block or a predetermined block may be used. An appropriate element which is not changed may also be used.

The processing section 1 also reads the pixel value $g_{i,j}$ of a signature image to be embedded, from the signature-image file 53 of the storage section 5 (S109). Step S107 and step S109 are executed in parallel. Step S109 may be executed after step S107 is executed. Alternatively, step S107 may be executed after step S109 is executed.

Next, the processing section 1 calculates δ (S111) by using the obtained $F_{i,j}(x', y')$ and $g_{i,j}$ according to expression (9), described above. The processing section 1 calculates the number-theoretic-transformed block $H_{i,j}(x, y)$ of the embedding-applied image block by using the number-theoretic-transformed block $F_{i,j}(x, y)$ of the original-image block and δ obtained in step S111, according to expression (8) (S113). Then, the processing section 1 calculates the inverse-number-theoretic-transformed theoretic-tranformed embedding-applied image block $h_{i,j}(x, y)$ of $H_{i,j}(x, y)$ by using expressions (1) and (2), described above.

FIG. 8 is an explanatory view showing how embedding affects pixel values.

More specifically, when the inverse transformed sequence of $H_{i,j}(x, y)$ is called $h_{i,j}(x, y)$, the following expression is satisfied due to a characteristic of the number theoretic transform as shown in the figure.

$$h_{x,y}(i, j) = \begin{cases} f_{x,y}(i, j) + \delta & i, j = N/2 \\ f_{x,y}(i, j) & \text{otherwise} \end{cases} \quad (13)$$

If N is an odd number, this relationship is not satisfied. Therefore, in the present embodiment, N needs to be an even number equal to 2 or larger.

The processing section 1 stores the obtained embedding-applied image block $h_{i,j}(x, y)$ at an appropriate area (work area or others) in the storage section 5 (S117). When steps S101 to S117, described above, have been executed for all blocks (or blocks in a desired area), the processing section 1 proceeds to step S121. If not (S119), the processing section 1 returns to step S101, and subsequent steps are repeated. The processing section 1 executes the above-described steps for all the blocks (or the blocks in the desired area) to obtain an embedding-applied image [h]. The processing section 1 saves the number-theoretic-transform parameter P and the embedding-applied image [h] into the embedding-applied image file 54 (S121). The processing section 1 transmits the parameter P and the embedding-applied image [h] to the receiving-side apparatus through the interface 6 or the output section 3 (S123). The processing section 1 may transmit N as a parameter, if necessary. Step S121 and step S123 are executed in parallel in this case. Step S123 may be executed after step S121 is executed. Alternatively, step S121 may be executed after step S123 is executed. The processing section 1 may also transmit the modulus P and, if necessary, the order N to the authentication-organization apparatus (authentication-organization computer 30).

3.2.2 Extraction Process

Figure 9:
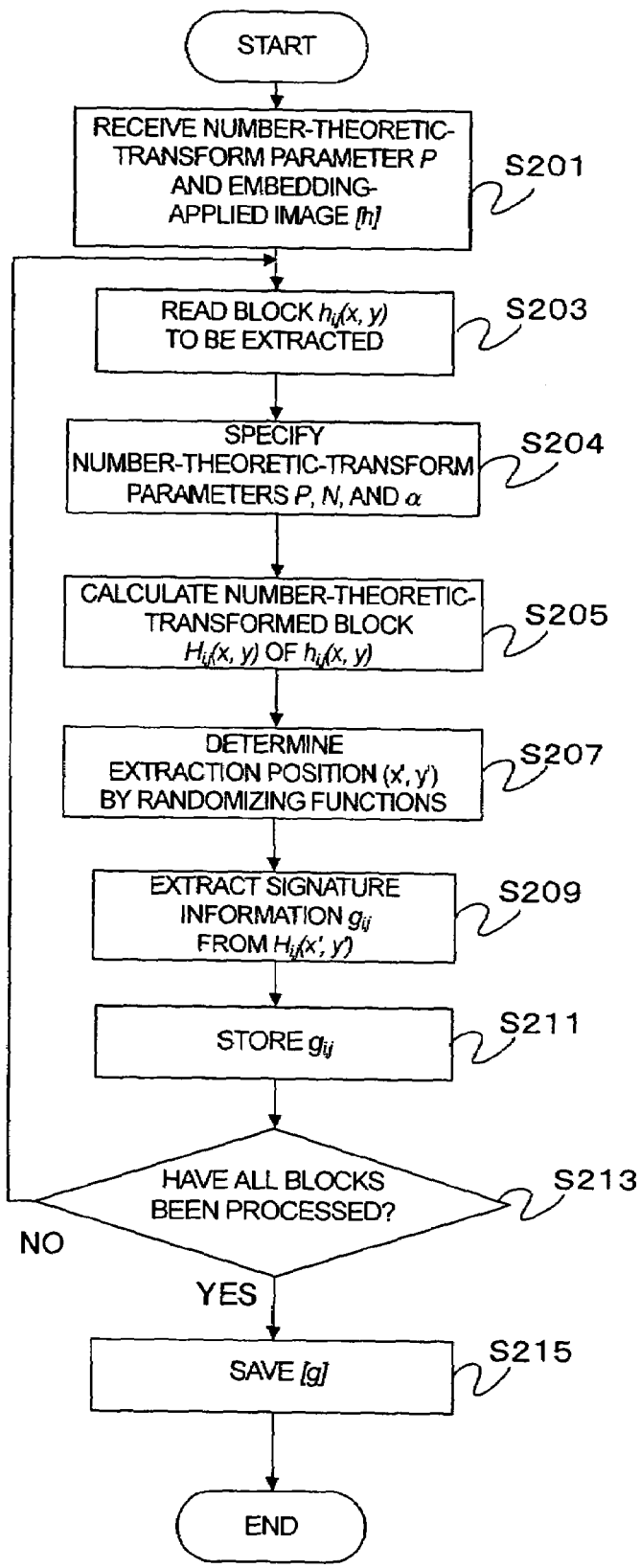
FIG. 9 is a flowchart of an extraction process.

FIG. 9 is a flowchart of the extraction process.

When the extraction process is started, the processing section 1 receives the number-theoretic-transform parameter P and the embedding-applied image [h] from the transmission-side apparatus, and stores them in the embeddingapplied-image file 54. The processing section 1 may further receive N from the transmission-side apparatus according to circumstances. The processing section 1 may receive the modulus P, which is a number-theoretic-transform parameter, and, if necessary, N from the authentication-organization apparatus. When [h] is stored in advance in the embedding-applied-image file 54, step S201 can be omitted. The processing section 1 refers to the embedding-applied-image file 54 to read an embedding-applied-image block $h_{i,j}(x, y)$ (S203), which is obtained by block-dividing the embedding-applied image [h].

Then, the processing section 1 specifies number-theoretic-transform parameters P, N, and α (S204) in the same way as in step S101, described above. The processing section 1 uses the specified parameters to calculate the number-theoretic-transformed block $H_{i,j}(x, y)$ of the embedding-applied image block $h_{i,j}(x, y)$ according to expressions (1) and (2) (S205). The processing section 1 also uses the randomizing functions $r_{x'}$ and $r_{y'}$ stored in advance in the storage section 5 to determine (S207) a signature-image extraction position (x', y') corresponding to the position where the signature image, described before, has been embedded.

Next, the processing section 1 extracts a pixel value $g_{i,j}$ of the signature image from the number-theoretic-transformed block $H_{i,j}(x', y')$ of the embedding-applied image block at the extraction position (S209). More specifically, the processing section 1 obtains a remainder when $H_{i,j}(x', y')$ is divided by ε as in the following expression to obtain the pixel value of the signature image. Expression (9) can be changed to expression (14), and thereby the pixel value $g_{i,j}$ of the signature image can be extracted.

$$g_{i,j}=H_{i,j}(x',y') (\mod \epsilon) \quad (14)$$

The processing section 1 stores the pixel value $g_{i,j}$ of the signature image at an appropriate area (work area or others) in the storage section 5 (S211). When processing steps S201 to S211 have already been applied to all blocks (or a predetermined range of blocks), the processing section 1 proceeds to step S215. If not (S213), the processing section 1 returns to step S203 and the above-described processing is repeated. The processing section 1 extracts $g_{i,j}$ from all the blocks (or the predetermined range of blocks) to obtain the signature image [g]. The processing section 1 saves the signature image [g] in the signature-image file 53 of the storage section 5, and displays it on the display section 4 or outputs it from the output section 3 or the interface 6 (S215). The processing section 1 may also obtain an original image [f] based on the embedding-applied image [h] and the signature image [g] to store and/or output and display it, if necessary.

When P and N are correct and the embedding-applied image [h] is not altered in an unauthorized manner, the correct signature image is taken out. If P and N are incorrect, or [h] has been altered in an unauthorized manner, $H_{i,j}(x, y)$ obtained when unauthorized alteration was made is largely different from the correct value due to a characteristic of the number theoretic transform. Therefore, it is highly possible that the signature information extracted therefrom is incorrect. Consequently, whether unauthorized alteration was made and the position thereof can be visually determined from the signature image formed of the extracted signature information.

4. Experimental Results

Figure 10:
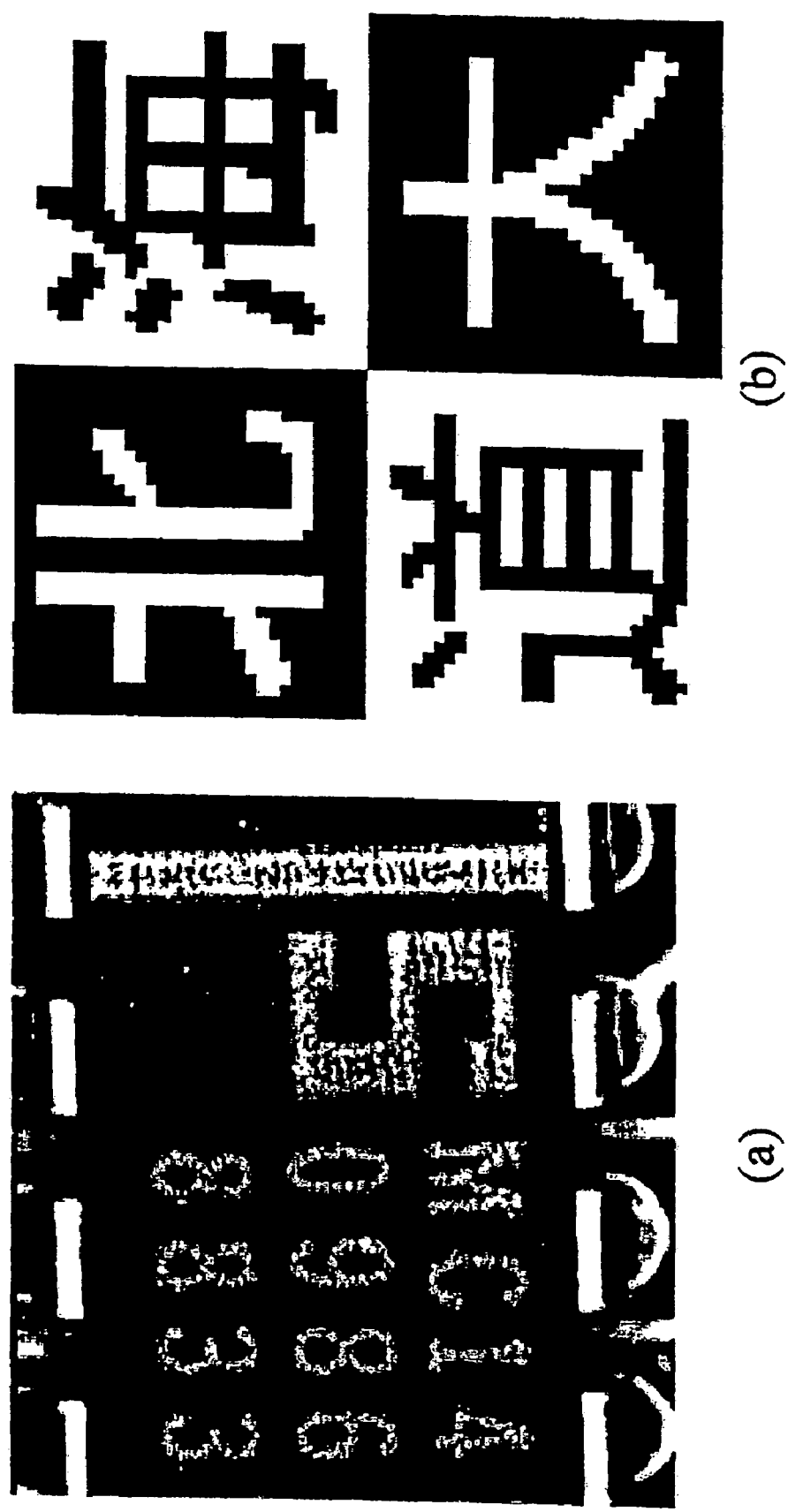
FIG. 10 is a view showing images used for experiments.

FIG. 10 is a view showing images used for experiments. FIG. 10(a) shows the original image and FIG. 10(B) shows a signature image. The present invention was applied to text (256 by 256 pixels, 8-bit gradations), which is a standard image of SJDBA, such as that shown FIG. 10(a), and effectiveness was examined. As number-theoretic-transform parameters serving as keys, P=85,147,693 and N=4 were used, and the signature image shown in FIG. 10(b) (64 by 64 pixels, 1-bit gradation) was used. Embedding strength s was set to 5. The following functions were used as the randomizing functions $r_x$ and $r_y$ as the most simple examples.

$$r_x = 1 \times \{P+i+j+f_{i,j}(0, 0)\} (\mod N)$$

$$r_y = 2 \times \{P+i+j+f_{i,j}(0, 0)\} (\mod N)$$

Figure 11:
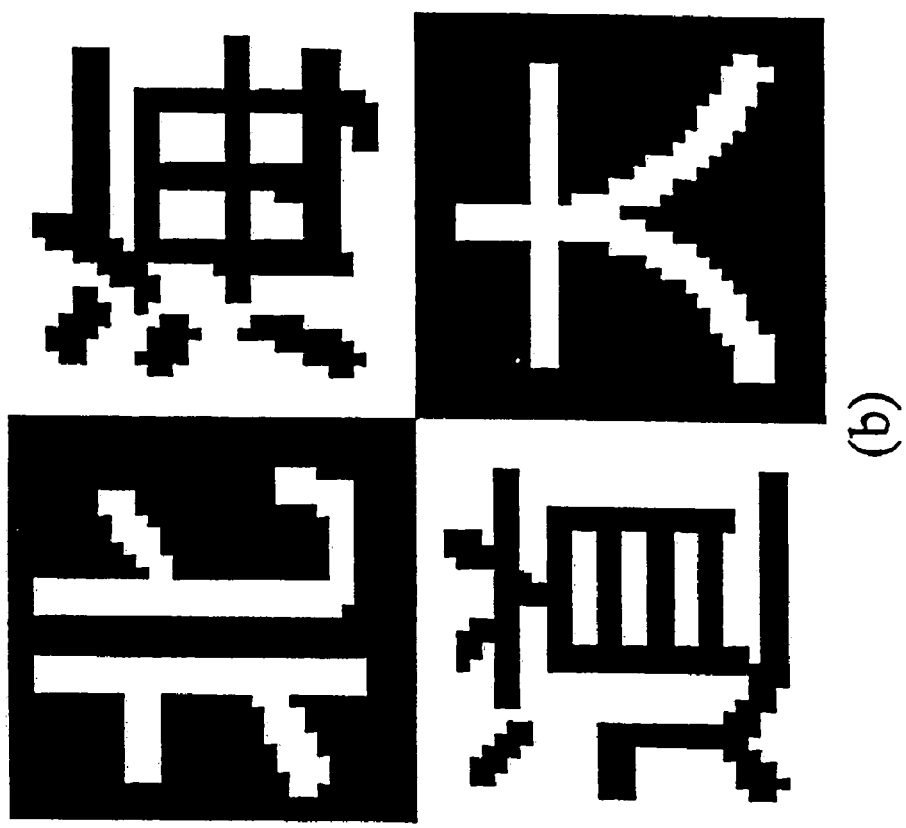
FIG. 11 is an image view (1) showing an experimental result.
Figure 11:
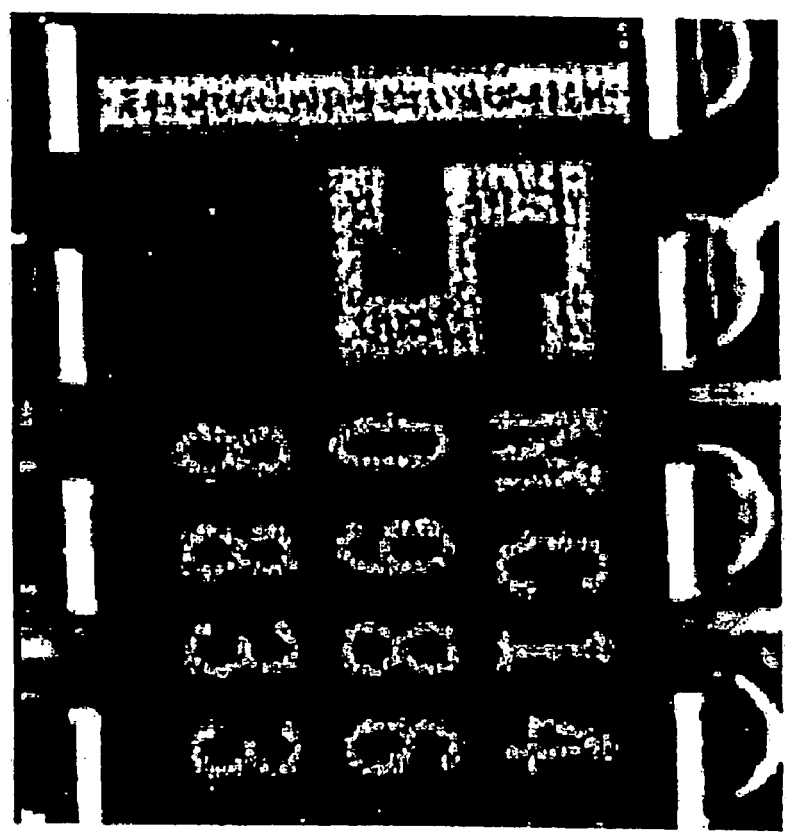

FIG. 11 shows an image figure (1) obtained as an experimental result. FIG. 11(a) is an embedding-applied image and FIG. 11(b) is an extracted signature image. An embedding process was applied to the image shown in FIG. 10(a) to obtain the image shown in FIG. 11(a). The SNR is 56.73 dB, and embedding deterioration was hardly seen.

Figure 12:
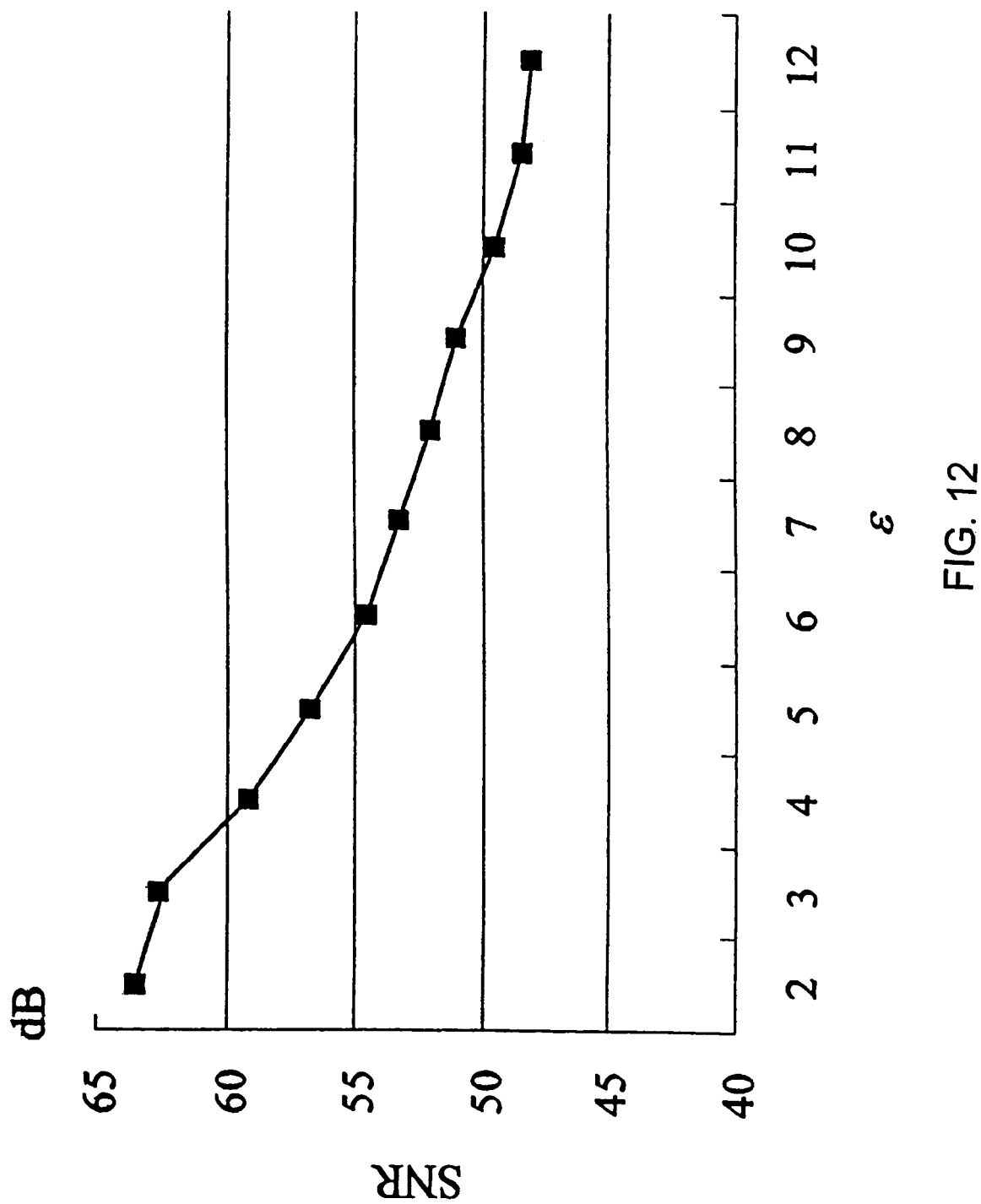
FIG. 12 shows the relationship between the quality of an output image and embedding strength $\epsilon$.

FIG. 12 shows the relationship between the quality of an output image and the embedding strength ε.

This figure is a graph showing the relationship between the SNR of an embedding-applied image and ε when the embedding processing was executed with ε being changed from 2 to 12. As ε increased, the SNR decreased. This is because the magnitude of δ in the embedding process is proportional to ε. Since the SNR was high for any ε, it means that deterioration was hardly seen in the images. FIG. 11(b) shows the signature image extracted from the image shown in FIG. 11(a), which was exactly the same was that shown in FIG. 10(b).

Figure 13:
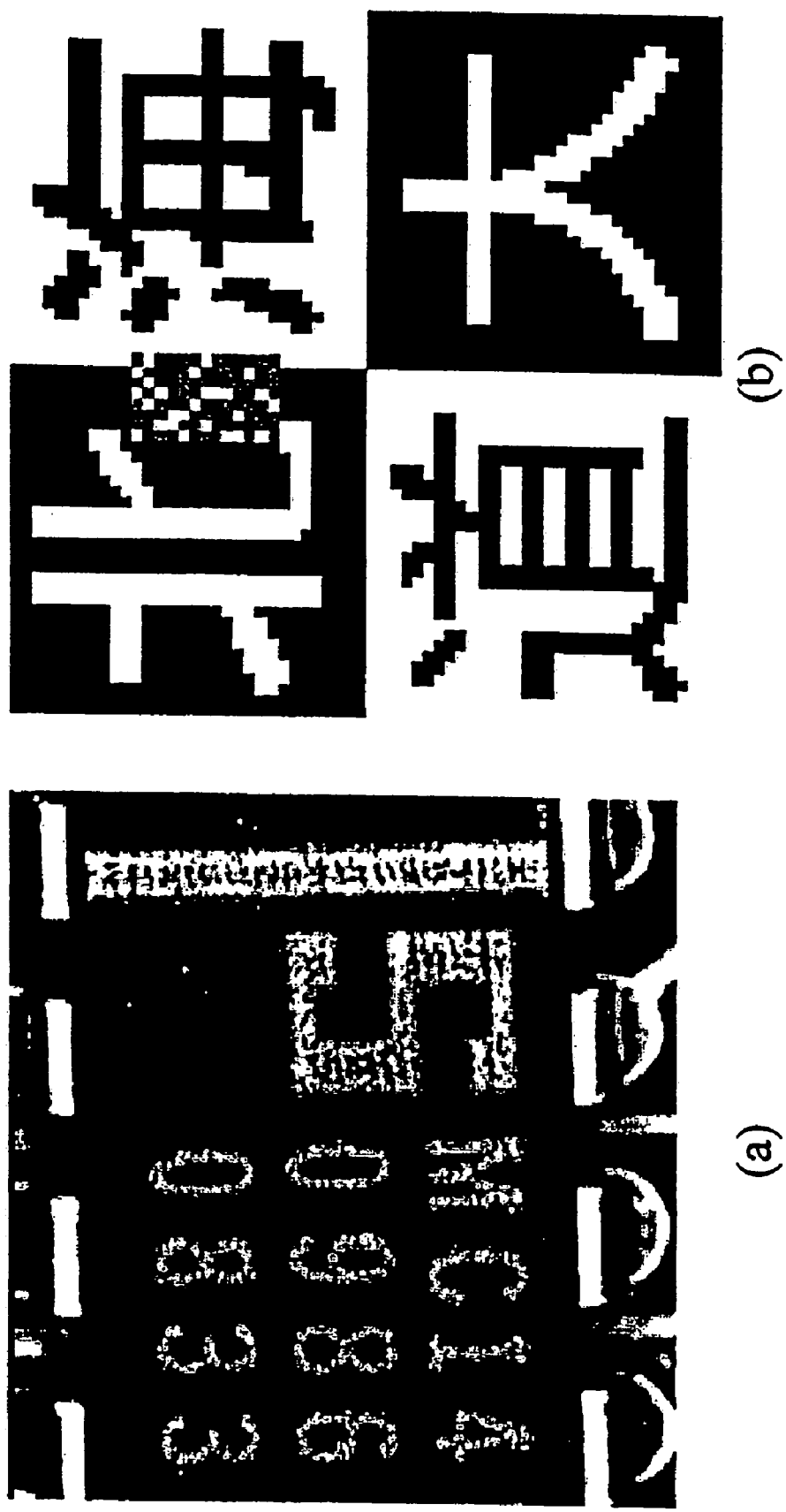
FIG. 13 is an image view (2) showing an experimental result.

FIG. 13 shows an image figure (2) obtained as an experimental result. FIG. 13(a) is an example image altered in an unauthorized manner and FIG. 13(b) is an image extracted from that shown in FIG. 13(a).

In this case, the image shown in FIG. 11(a) was altered in an unauthorized manner to obtain the image shown in FIG. 13(a). More specifically, a rectangular area which included a number "0" was copied and pasted on an area which included a number "8" by using photo retouch software. FIG. 13(b) shows a signature image extracted from the image shown in FIG. 13(a). Since the position where the alteration was made in an unauthorized manner matches a portion where the signature image was broken, it was understood that the position where an alteration is made can be visually determined.

5. Security Discussions

The security of the present invention obtained when an embedding-applied image is altered in an unauthorized manner will be discussed below. It is assumed that the attacker knows an embedding-applied image [h] and all algorithms but does not know key information P or N, the original image [f], or a signature image [g].

(1) Analyzing Appropriate Unauthorized Alteration From Algorithms

For simplicity, the following discussion will be made for a case in which N is set to 2. An original-image block is assumed to be as follows with a, b, c, and d being set to positive integers.

$$f_{i,j}(x, y) = \begin{pmatrix} a & b \\ c & d \end{pmatrix}$$

This block is changed to the following by the embedding process.

$$h_{i,j}(x, y) = \begin{pmatrix} a & b \\ c & d+\delta \end{pmatrix}$$

Then, the following is obtained by the number theoretic transform in the extraction process.

$$H_{i,j}(x, y) = \begin{pmatrix} A+\delta & B-\delta \\ C-\delta & D+\delta \end{pmatrix}$$

Correct signature information can be obtained by expression (14). A case in which $h_{i,j}(x, y)$ is altered in unauthorized manner as shown below will be examined, with $\mu_1$, $\mu_2$, $\mu_3$, and $\mu_4$ being set to integers.

$$h_{i,j}(x, y) = \begin{pmatrix} a+\mu_1 & b+\mu_2 \\ c+\mu_3 & d+\delta+\mu_4 \end{pmatrix}$$

The number theoretic transform is applied to $h_{i,j}(x, y)$ in the extraction process, the following are obtained.

$$H_{i,j}(x, y) = \begin{pmatrix} A+\delta+v_1 & B-\delta+v_2 \\ C-\delta+v_3 & D+\delta+v_4 \end{pmatrix}$$

$$v_1 = \mu_1 + \mu_2 + \mu_3 + \mu_4$$

$$v_2 = \mu_1 + \mu_3 + \alpha(\mu_2 + \mu_4)$$

$$v_3 = \mu_1 + \mu_2 + \alpha(\mu_3 + \mu_4)$$

$$v_4 = \mu_1 + \alpha(\mu_2 + \mu_3) + \alpha^2 \mu_4$$

When $\lambda 1$, $\lambda 2$, $\lambda 3$, and $\lambda 4$ are set to any positive integers, $$v_1 = \mu_1 + \mu_2 + \mu_3 + \mu_4 = \lambda_1 \epsilon$$

$$v_2 = \mu_1 + \mu_3 + \alpha(\mu_2 + \mu_4) = \lambda_2 \epsilon$$

$$v_3 = \mu_1 + \mu_2 + \alpha(\mu_3 + \mu_4) = \lambda_3 \epsilon$$

$$v_4 = \mu_1 + \alpha(\mu_2 + \mu_3) + \alpha^2 \mu_4 = \lambda_4 \epsilon$$

if there are $\mu_1$, $\mu_2$, $\mu_3$, and $\mu_4$ which satisfy the foregoing at the same time, unauthorized alteration cannot be detected with the present invention. This is because the remainders obtained when $v_1$, $v_2$, $v_3$, and $v_4$ are divided by "e" become zero due to unauthorized alteration. In this case, the simultaneous equations for $\mu_1$, $\mu_2$, $\mu_3$, and $\mu_4$ include $\alpha$. Assuming that the attacker does not know $\alpha$, it is difficult for the attacker to solve the simultaneous equations analytically.

(2) Any Partial Unauthorized Alteration

In the present invention, signature information is extracted by the use of the remainder obtained when $H_{i,j}(x', y')$ is divided by $\epsilon$. This means that correct signature information is obtained at a probability of $\epsilon^{-1}$ per block even if any unauthorized alteration was made. In general, there is almost no meaning due to image redundancy when only one block is altered in an unauthorized manner. Therefore, the attacker needs to alter a plurality of blocks in an unauthorized manner. When T blocks are altered in an unauthorized manner, its success probability is $\epsilon^{-T}$. When N is 2 and $\epsilon$ is 5, for example, a probability of successful unauthorized alteration of 4 by 4 blocks (8 by 8 pixels) is $5^{-16}$, which means that unauthorized alteration with this method can be detected at a high possibility. As $\epsilon$ increases, unauthorized alteration becomes difficult, but image deterioration also becomes high. Therefore, in the present invention, security and image quality are trade-offs. However, in an experiment, the SNR was 48.2 dB when $\epsilon$ was 12. This means that embedding can be performed such that deterioration is visibly hardly seen even when $\epsilon$ is relatively large.

(3) Unauthorized Alteration in Bit Plane

Since the present invention is not an embedding technique based on a bit plane, an attack focusing on it does not have any meaning. For example, unauthorized alteration of only the LSB affects $h_{i,j}(x, y)$ a little but affects $H_{i,j}(x, y)$ much due to a characteristic of the number theoretic transform. Therefore, it is highly possible that obtained signature information is unauthorized one.

(4) Exhaustive Search for Key

Since P can be any compound number generated by powers of prime numbers, exhaustive search for the key P can be performed by a computer with a search range of integers. Whether P is correct is determined by a person by visually checking whether an extracted signature image is meaningful. It is thought that this job takes much time. Therefore, it is practically difficult to perform exhaustive search for the key.

(5) Geometric Change Such as Enlargement, Reduction, and Rotation

If the resolution or the shape is changed, since $r_{x'}$ and $r_{y'}$ or N cannot correspond to such changes, the change is detected as unauthorized alteration in the entire image in the present invention.

(6) Cut and Paste Within an Image

Unauthorized alteration will be examined in which [h] is divided into blocks, and the positions of blocks are exchanged, or a block is copied and pasted at any position. The unauthorized alteration in the above-described experiment is of this type. In this case, since $r_{x'}$ and $r_{y'}$ are functions which include i and j in the present invention, $r_{x'}$ or $r_{y'}$ cannot correctly correspond in blocks whose positions were changed, in this type of unauthorized alteration. Therefore, unauthorized alteration of this type can be detected at a high possibility.

(7) Cut and Paste Between a Plurality of Different Images to Which Embedding has Been Applied For example, a case will be examined in which each of a plurality of different embedding-applied images is divided into blocks, and blocks located at the same position are exchanged to generate one image. It is assumed here that all the images have the same resolution and the same P, N, and [g] are used in their embedding processes. In this case, since $r_{x'}$ and $r_{y'}$ are generated as functions which include the pixel value $f_{i,j}(0, 0)$ in the left adjacent block in the present invention, $r_{x'}$ or $r_{y'}$ cannot correctly correspond. Therefore, unauthorized alteration of this type can be detected at a high possibility.

6. Conclusion

In the present invention, unauthorized-alteration-position detection which uses fragile electronic watermarking employing the number theoretic transform has been proposed as an application of robust electronic watermarking employing a conventional orthogonal transform. The effectiveness of the proposed method was examined in the experiments, and the successful results were obtained. In addition, security of the proposed method has also been examined against various attacks.

An unauthorized-alteration detecting method or an unauthorized-alteration detecting apparatus and system according to the present invention can be provided by an unauthorized-alteration detecting program for making a computer execute each step thereof, a computer-readable recording medium having recorded the unauthorized-alteration detecting program, a program product which includes the unauthorized-alteration detecting program and which can be loaded into an internal memory of a computer, a computer which includes the program, such as a server, and others.

In addition, as an application range, the function of an unauthorized-alteration detecting method according to the present invention or an unauthorized-alteration detecting program according to the present invention and its execution function can be provided for various image input apparatuses such as digital cameras and scanners to embed watermarking information into images read by the apparatuses.

INDUSTRIAL APPLICABILITY

According to the present invention, an unauthorized-alteration detecting method, an unauthorized-alteration detecting program, and a recording medium having recorded the program, which use a fragile electronic watermarking method employing the number theoretic transform, to which a robust electronic watermarking method employing orthogonal transform has been applied can be proposed. In addition, according to the present invention, an unauthorized-alteration detecting method and others capable of easily and visually checking whether unauthorized alteration was made and the position thereof can be proposed.

In conventional electronic watermarking methods employing the number theoretic transform, signature information is embedded by replacing a relatively small range of two lowest order bits or so in the image bits of the original image. In contrast, in the present invention, security can be further enhanced by embedding signature information by using all or a desired large range of pixel bits of the original image. In the conventional methods employing the number theoretic transform, signature information is embedded by multiplying (convoluting) into a number theoretic transform domain. In contrast, in the present invention, the calculation speed can be increased with smaller numerical errors by embedding signature information by additions.

The invention claimed is:

1. An unauthorized-alteration detecting method comprising:
a step in which a processing section specifies a modulus P, an order N which is an even number equal to or larger than 2, and a root α, which are parameters of number theoretic transform;
a step in which the processing section reads from a storage section an original-image block $f_{i,j}(x, y)$ obtained by block-dividing an original image [f] to which embedding is to be applied;
a step in which the processing section uses the modulus P, the order N, and the root α specified, to apply the number theoretic transform to the original-image block $f_{i,j}(x, y)$ to calculate the number-theoretic-transformed block $F_{i,j}(x, y)$ of the original-image block;
a step in which the processing section determines an embedding position (x', y') of a signature image in each block according to a predetermined randomizing function which uses information of a left adjacent block, a right adjacent block, or a surrounding predetermined block as a parameter;
a step in which the processing section reads from the storage section a pixel value $g_{i,j}$ of the signature image to be embedded;
a step in which the processing section obtains an integer having the minimum absolute value and satisfying $F_{i,j}(x', y')+\delta=g_{i,j}(\mod \epsilon)$ as an embedding amount δ in each block from the number-theoretic-transformed block $F_{i,j}(x', y')$ of the original-image block at the embedding position, the pixel value $g_{i,j}$ of the signature image, and embedding strength ε;
a step in which the processing section adds or subtracts the embedding amount δ to or from the number-theoretic-transformed block $F_{i,j}(x, y)$ of the original-image block, based on (x, y) to obtain the number-theoretic-transformed block $H_{i,j}(x, y)$ of an embedding-applied-image block;
a step in which the processing section applies inverse number theoretic transform to the number-theoretic-transformed block $H_{i,j}(x, y)$ to obtain the embedding-applied-image block $h_{i,j}(x, y)$; and
a step in which the processing section obtains the embedding-applied-image block $h_{i,j}(x, y)$ for each of all (i, j) blocks to obtain an embedding-applied image [h], and stores it in the storage section and/or outputs it from an output section or an interface.

2. An unauthorized-alteration detecting method according to claim 1, further comprising a step in which the processing section transmits the modulus P and the embedding-applied image [h], and, if necessary, the order N to an extraction-side apparatus through the output section or the interface.

3. An unauthorized-alteration detecting method of claim 1, further comprising a step in which the processing section obtains the original image [h] according to the embedding-applied image [h] and the signature image [h].

4. An unauthorized-alteration detecting method of claim 1, wherein P is any compound number generated by a power of a prime number.

5. An unauthorized-alteration detecting method of claim 1, wherein N is common to an embedding side and an extraction side of the signature image and stored in advance in the storage section, or is transferred from the embedding side to the extraction side.

6. An unauthorized-alteration detecting method of claim 1, wherein the processing section selects the order N among candidates of the order N, obtained by $N|GCD[(P_1-1), (P_2-1), \ldots, (P_m-1)]$ according to a predetermined priority.

7. An unauthorized-alteration detecting method of claim 1, wherein the processing section calculates the root α uniquely determined according to a predetermined expression of the Chinese remainder theorem or others, based on the modulus P and the order N specified.

8. An unauthorized-alteration detecting method of claim 1, wherein
the processing section specifies P expressed by $P=p_1^{r_1} p_2^{r_2} \ldots p_m^{r_m}$, where $p_i$ is a prime number and $r_i$ is a positive integer;
the processing section selects the order N among positive integers satisfying $N|GCD[(p_1-1), (p_2-1), \ldots, (p_m-1)]$, or reads the order N from the storage section;

the processing section calculates a root $\alpha_{1,i}$ of the order N with respect to the modulus $p_i$;

the processing section obtains a root $\alpha_{2,i}$ of the order N with respect to the modulus $p_i^{ri}$ from $\alpha_{1,i}$; and the processing section obtains the root $\alpha$ of the order N with respect to the modulus P from $\alpha_{2,i}$ according to the Chinese remainder theorem.

9. An unauthorized-alteration detecting method of claim 1, wherein the processing section uses P, N, and $\alpha$ to execute the number theoretic transform between x(n) and X(k) by the following expressions, $$X(k) = \sum_{n=0}^{N-1} x(n)\alpha^{kn} \pmod{P} \quad (1)$$

$$x(n) = N^{-1} \sum_{k=0}^{N-1} X(k)\alpha^{-kn} \pmod{P} \quad (2)$$

wherein P is any compound number generated by a power of a prime number, $\alpha$ is a positive integer, N is the minimum positive integer satisfying $\alpha^N = 1 \pmod{P}$, X=[T]x x=[T]$^{-1}$X

[T] is a transformation matrix, and [T]$^{-1}$ is an inverse transformation matrix.

10. An unauthorized-alteration detecting method of claim 1, wherein the randomizing function uses the value of the modulus P and/or a pixel value in an adjacent block or a pixel value in a predetermined block which is not changed by an embedding process, as a parameter, and determines the position uniquely.

11. A computer readable medium encoding an unauthorized-alteration detecting program for making a computer execute each of the following steps, the following steps including:

a step in which a processing section specifies a modulus P, an order N which is an even number equal to or larger than 2, and a root $\alpha$, which are parameters of number theoretic transform;

a step in which the processing section reads from a storage section an original-image block $f_{i,j}(x, y)$ obtained by block-dividing an original image [f] to which embedding is to be applied;

a step in which the processing section uses the modulus P, the order N, and the root $\alpha$ specified, to apply the number theoretic transform to the original-image block $f_{i,j}(x, y)$ to calculate the number-theoretic-transformed block $F_{i,j}(x, y)$ of the original-image block;

a step in which the processing section determines an embedding position (x', y') of a signature image in each block according to a predetermined randomizing function which uses information of a left adjacent block, a right adjacent block, or a surrounding predetermined block as a parameter;

a step in which the processing section reads from the storage section a pixel value $g_{i,j}$ of the signature image to be embedded;

a step in which the processing section obtains an integer having the minimum absolute value and satisfying $F_{i,j}(x', y')+\delta \equiv g_{i,j} \pmod{\epsilon}$ as embedding amount $\delta$ in each block from the number-theoretic-transformed block $F_{i,j}(x', y')$ of the original-image block at the embedding position, the pixel value $g_{i,j}$ of the signature image, and embedding strength $\epsilon$;

a step in which the processing section adds or subtracts the embedding amount $\epsilon$ to or from the number-theoretic-transformed block $F_{i,j}(x, y)$ of the original-image block, based on (x, y) to obtain the number-theoretic-transformed block $H_{i,j}(x, y)$ of an embedding-applied-image block;

a step in which the processing section applies inverse number theoretic transform to the number-theoretic-transformed block $H_{i,j}(x, y)$ to obtain the embedding-applied-image block $h_{i,j}(x, y)$; and a step in which the processing section obtains the embedding-applied-image block $h_{i,j}(x, y)$ for each of all (i, j) blocks to obtain an embedding-applied image [h], and stores it in the storage section and/or outputs it from an output section or an interface.

* * * * *